United States Patent [19]

Lee et al.

[11] Patent Number: 5,276,913

[45] Date of Patent: Jan. 4, 1994

[54] PHASE-LOCKED-LOOP CIRCUIT FOR RADIO TRANSCEIVER

[75] Inventors: Steven G. Lee, Elgin; Louis J. Vannatta, Crystal Lake, both of Ill.

[73] Assignee: Motorola, Inc., Schaumburg, Ill.

[21] Appl. No.: 796,975

[22] Filed: Nov. 25, 1991

[51] Int. Cl.⁵ .................. H04B 1/40; H04B 7/00; H03L 7/00

[52] U.S. Cl. .................................. 455/76; 455/78; 455/265; 331/2; 331/14

[58] Field of Search .............. 455/75, 76, 78, 84, 455/255, 260, 265; 331/2, 14, 25

[56]  References Cited

U.S. PATENT DOCUMENTS

| | | | |
|---|---|---|---|
| 3,764,912 | 10/1973 | Abraham et al. | 455/75 |
| 4,061,973 | 12/1977 | Reimers et al. | 455/76 |
| 4,777,655 | 10/1988 | Numata et al. | 455/76 |

Primary Examiner—Jin F. Ng
Assistant Examiner—Lisa Charouel
Attorney, Agent, or Firm—Robert H. Kelly

[57]  ABSTRACT

A phase-locked-loop circuit for a radio transceiver operative to transmit and to receive modulated signals during nonconcurrent time periods. During time periods in which the radio transceiver is to generate and to transmit a modulated signal, the phase-locked-loop circuit is connected to the transmitter portion of the transceiver. During time periods in which the radio transceiver is to receive a modulated signal, the phase-locked-loop circuit is connected to the receiver portion of the transceiver. A switch, preferably comprised of a multiplexer, alternately connects the phase-locked-loop with the transmitter portion and the receiver portion of the transceiver.

8 Claims, 5 Drawing Sheets

PHASE-LOCKED-LOOP CIRCUIT FOR RADIO TRANSCEIVER

BACKGROUND OF THE INVENTION

The present invention relates generally to radio transceiver constructions operative to transmit and to receive modulated signals at nonconcurrent time periods, and, more particularly, to a phase-locked-loop circuit operable in such a radio transceiver construction.

A communication system is operative to transmit information (referred to hereinbelow as an "information signal") between two or more locations, and includes, at a minimum, a transmitter and a receiver interconnected by a communication channel. A radio communication system is a communication system in which the transmission channel comprises a radio-frequency channel wherein the radio-frequency channel is defined by a range of frequencies of the communication spectrum.

The transmitter, which forms a portion of a radio communication system, includes circuitry for converting the information signal into a form suitable for transmission thereof upon a radio-frequency channel. Such circuitry includes modulation circuitry which performs a process referred to as modulation. In such a process, the information signal which is to be transmitted is impressed upon a radio-frequency electromagnetic wave.

The radio-frequency electromagnetic wave upon which the information signal is impressed is of a frequency within a range of frequencies defining in the radio-frequency channel upon which the information is to be transmitted. The radio-frequency, electromagnetic wave is commonly referred to as a "carrier signal," and the radio-frequency, electromagnetic wave, once modulated by the information signal, is commonly referred to as a modulated signal.

Various modulation schemes are known for impressing the information signal upon the carrier signal to form thereby the modulated signal. For instance, amplitude modulation, frequency modulation, phase modulation, and combinations thereof are all modulation schemes by which an information signal may be impressed upon a carrier wave to form a modulated signal.

Radio communication systems are advantageous in that no physical interconnection is required between the transmitter and the receiver; once the information signal is modulated to form a modulated signal, the modulated signal may be transmitted over large distances.

A two-way, radio communication system is a radio communication system, similar to the radio communication system described above, but which further permits both transmission of information to a location and transmission of information from that location. Each location of such a two-way, radio communication system contains both a transmitter and a receiver. The transmitter and receiver positioned at a single location typically comprise a unit referred to as a radio transceiver, or, more simply, a transceiver.

Conventionally, transceivers constructed to be operated in two-way communication systems are operative to transmit a modulated signal upon a first radio frequency channel and to receive a modulated signal transmitted upon a second, nonoverlapping frequency channel. Because signals transmitted to and by such transceivers are transmitted upon different radio frequency channels, simultaneous two-way communication between two or more transceivers is permitted. Signals are continuously transmitted upon each of the two radio frequency channels to effectuate the two-way communication. Such two-way communication is oftentimes referred to generally by the term duplex operation of the transceiver.

Certain frequency bands of the electromagnetic frequency spectrum have been allocated for such two-way communication. For instance, a frequency band extending between 800 MHz and 900 MHz has been allocated in the United States for cellular communication systems. A plurality of radio frequency channels have been defined in such frequency band permitting operation of numerous cellular telephones (which constitute a type of transceiver construction) thereon. Another frequency band has been allocated for communication by cordless telephones (which constitute another type of radio transceiver construction).

Increased popularity of use of such two-way communication systems has resulted in increased demand for access to the finite number of radio frequency channels allocated for such two-way communication. Schemes have been developed to utilize more efficiently the frequency bands allocated for such use.

Several of such schemes involve the encoding of the information signal prior to modulating the information signal upon a carrier wave. By advantageous encoding of the information signal, the signal becomes compacted, and the signal, once modulated, may be transmitted more efficiently (i.e., the same amount of information may be transmitted in a lesser amount of time). Additionally, when encoded, the resultant modulated signal need not be transmitted continuously; rather, the modulated signal may be transmitted in discrete bursts.

When transmitted in discrete bursts, a single radio frequency channel may be used to transmit information to, and transmit information from, a transceiver as long as the signals transmitted to and transmitted from the transceiver are transmitted during nonoverlapping time periods. By transmitting and receiving information upon a single channel, the transmission capacity of frequency bands allocated for such two-way communication may be doubled. Signal encoding schemes, by compacting the transmitted signal, can permit even greater increases in transmitter capacity.

Concurrent with such increased popularity of use of two-way communication systems is miniaturization of the circuitry comprising the transceivers. Such miniaturization has permitted reductions in the dimensions and weights of the transceivers to the extent that transceiver constructions are available which may be conveniently carried by a user.

Further miniaturization of such radio transceivers is still a critical design goal, and continuing efforts are exerted to reduce further the physical dimensions of such radio transceivers.

Conventional radio transceivers contain both a transmitter portion and a receiver portion to permit simultaneous transmission and reception of modulated signals. Because both the transmitter portion and receiver portion must be operative simultaneously, the circuitry of the transmitter portion and of the receiver portion must be separate and both be simultaneously operable.

As new encoding techniques permit radio transceiver constructions having transmitter portions and receiver portions which need not be simultaneously operable, such identical circuitry becomes redundant. Such redundant circuitry results in a greater than necessary number of circuit components resulting in unnecessary component costs, and needlessly prevents the reduction in the power dissipation necessary to operate a radio transceiver. Additionally, use of redundant components results in a greater than necessary circuit-size dimension.

There is, accordingly, a need to design radio transceiver constructions which do not include such redundant circuit components to reduce thereby, the circuit cost, physical dimensions of such circuits and the power dissipation during operation of such circuits.

SUMMARY OF THE INVENTION

The present invention, accordingly, provides a means for reducing the number of circuit components of a radio transceiver.

The present invention further advantageously provides a phase-locked-loop circuit for a radio transceiver.

The present invention yet further advantageously provides a radio transceiver of improved construction.

The present invention provides further advantages and features, the details of which will become more apparent by reading the detailed description of the preferred embodiments hereinbelow.

In accordance with the present invention, therefore, a phase-locked-loop of a radio transceiver having a transmitter portion and a receiver portion is disclosed. The transmitter portion and the receiver portion of the radio transceiver each has at least one local oscillator forming a portion thereof. The phase-locked-loop includes means for alternately coupling the phase-locked-loop with the at least one local oscillator of the transmitter portion, or to the at least one local oscillator of the receiver portion.

BRIEF DESCRIPTION OF THE DRAWINGS

The present invention will be better understood when read in light of the accompanying drawings in which.

DESCRIPTION OF THE PREFERRED EMBODIMENTS

In a conventional radio transceiver, two-way communication is effectuated by simultaneous operation of transmitter circuitry and receiver circuitry. Signals transmitted to the radio transceiver are transmitted upon a first frequency channel, and signals transmitted by the radio transceiver are transmitted upon a second frequency channel.

Figure 1:
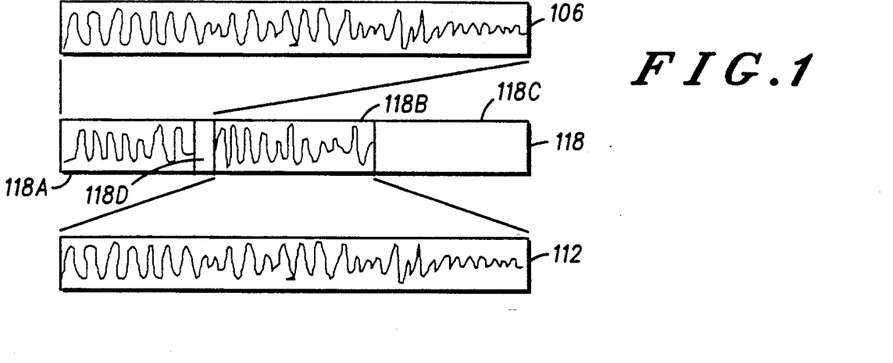
FIG. 1 is a schematic representation illustrating signals transmitted by and received by a radio transceiver during a selected time period.

Referring first now to the schematic illustration of FIG. 1, such signals transmitted by, and received by, a radio transceiver during a selected time period are represented. The waveform pictured within block 106 represents a conventional, modulated signal transmitted by a radio transceiver of conventional construction. Similarly, the waveform illustrated within block 112 is representative of a conventional, modulated signal received by a radio transceiver of conventional construction. Two-way communication is permitted as both the transmitter circuitry operative to generate and transmit the waveform illustrated in block 106 and the receiver circuitry operative to receive the waveform illustrated within block 112 are simultaneously operable. Because the transmitter circuitry and the receiver circuitry must be capable of simultaneous operation, such transmitter and receiver circuitry must each be capable of independent, and, hence, simultaneous operation.

As mentioned previously, to increase the capacity of existing communication systems, schemes have been developed to encode an information signal, and to impress the encoded, information signal upon a carrier wave thereby to form a modulated signal.

As an encoding process utilized to encode the information signal may advantageously result in signal compaction, a modulated signal formed of an encoded information signal permits more efficient transmission of information between a transmitter and a receiver than a modulated signal formed of an information signal which has not been encoded. Additionally, because of such encoding, the modulated signal formed thereof need not be transmitted continuously, but, rather, the modulated signal may be transmitted in discrete bursts.

Accordingly, the schematic representation of FIG. 1 illustrates mapping of the waveform illustrated within block 106 into block portion 118A of block 118, and mapping of the waveform illustrated within block 112 into block portion 118B of block 118. A three to one mapping ratio is shown in the representation of FIG. 1. Other ratios are, of course, also possible. Block portions 118C and 118D of block 118 are also shown in the Figure. While in the scheme of FIG. 1, no waveform is transmitted during the time period encompassed by portion 118C, it is to be understood that a waveform could similarly be transmitted during such time period. Block portion 118D represents a "time gap" between portions 118A and 118B, and is advantageously utilized by the phase-locked-loop circuit of the present invention to provide a "lock time" required of a phase-locked-loop circuit.

As an encoded, modulated signal need not be transmitted continuously, but, rather, may be transmitted in discrete bursts, a single transmission channel may be used to transmit signals generated by two or more transmitters to increase thereby the transmission capacity of any two-way communication system. Block 118 of FIG. 1 illustrates a scheme in which a single transmission channel is utilized by a single radio transceiver both to transmit and to receive modulated signals. As only a single transmission channel is required to permit two-way communication with a radio telephone, the transmission capacity of a two-way communication system may be increased two-fold, or, in other schemes, by even greater amounts. In essence, the transmission channels, of which two were required in a conventional two-way communication system, can be replaced with "time slots" located at a single frequency (i.e., transmission) channel. Certain time slots are associated with transmission of information, and other time slots are associated with reception of information.

When a radio transceiver is operable in a scheme in which modulated signals are transmitted to, or transmitted by, the radio transceiver during nonoverlapping time periods, duplication of certain parts of the receiver and transmitter circuitry is not required, as such circuitry is not simultaneously operated. By constructing a radio transceiver in which circuit portions of the circuitry comprising the transmitter portion and the receiver portion of a radio transceiver may be shared, a radio transceiver of smaller dimensions, lower cost, and less power dissipation may be constructed.

Figure 2:
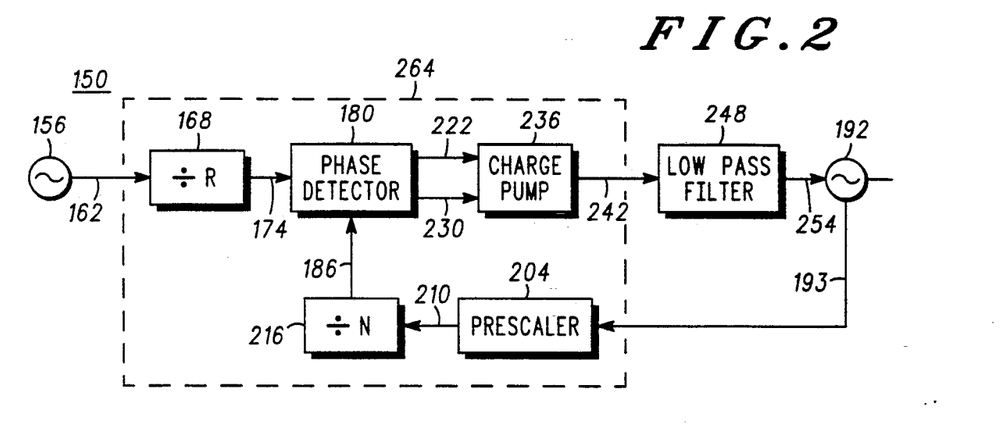
FIG. 2 is a block diagram of a phase-locked-loop circuit operative to lock the frequency of oscillation of an oscillating signal with the reference oscillation frequency of an oscillating signal generated by a reference oscillator.

Turning now to the block diagram of FIG. 2, a circuit, referred to generally by reference numeral 150, operative to lock the frequency of oscillation of an oscillating signal with the reference oscillation frequency of an oscillating signal generated by a reference oscillator, is shown.

Circuits similar in function with that of circuit 150 of FIG. 2 form portions of the transmitter portion and receiver portion of many conventional, radio transceiver constructions. Such circuits are typically utilized by transmitter circuitry to prevent frequency drift of oscillating signals generated by oscillators which generate oscillating signals. Such oscillating signals form the carrier signal upon which information is impressed during modulation of a signal. Similarly, other of such circuits are typically utilized by receiver circuitry to prevent frequency drift of oscillating signals generated by oscillators which generate oscillating signals. Such oscillating signals are required to convert a radio frequency signal downward in frequency to recreate the information-content of a modulated signal.

To prevent such frequency drift, circuits similar to that of circuit 150 of FIG. 2, are operative to maintain the frequency of the oscillating signal generated by an oscillator in a desired frequency relationship with the oscillating signal generated by a second oscillator.

With respect then to circuit 150 of FIG. 2, reference oscillator 156 generates a stable, oscillating signal on line 162. Line 162 is coupled to divider circuit 168 which is operative to reduce the frequency (such reduction is indicated in the Figure by a factor of R) of the oscillating signal supplied thereto on line 162, and to generate an oscillating signal of a desired, reduced frequency on line 174.

Line 174 is coupled as an input to phase detector 180. Phase detector 180 also is coupled to receive a signal on line 186. The signal generated on line 186 is of a value proportional to the oscillating signal generated by oscillator 192 on line 198. Line 198 is coupled to prescaler 204 which generates a scaled signal on line 210 which is, in turn, coupled to divider circuit 216. (Prescaler 204 is actually a divider circuit in which a signal is "scaled" to that of the signal applied thereto.) Divider circuit 216 is operative in a manner similar with that of divider circuit 168 to reduce the frequency (such reduction is indicated in the Figure by a factor of N) of the oscillating signal supplied thereto on line 210.

Phase detector 180 is operative to compare the phases, and, hence, the frequencies, of the oscillating signals supplied thereto on lines 174 and 186. Phase detector 180 generates signals, here on lines 222 and 230, indicative of the phase differences between the oscillating signals generated on lines 174 and 186. The signals generated on lines 222 and 230 are applied to charge pump 236. Charge pump 236 generates a signal on line 242 responsive to the phase differences between the oscillating signals supplied to phase detector 180 on lines 174 and 186.

Line 242 is coupled to a storage device, here a low pass filter (the capacitive elements comprising the low pass filter 248 form the storage element thereof). Filter 248 is oftentimes referred to as a "loop filter." The filtered (i.e., stored) signal on line 254 is applied to oscillator 192. The signal generated on line 254 is operative to cause the oscillating frequency of oscillator 192 to be altered responsive to the values of the signals generated by phase detector 180. The frequency of the oscillating signal generated by oscillator 192 is thereby maintained in a desired relationship with the frequency of the oscillating signal generated by oscillator 156.

The elements encompassed by block 264, shown in hatch, and comprising dividers 168 and 216, phase detector 180, prescaler 204, and charge pump 236 collectively form a phase-locked-loop circuit. Such a circuit is oftentimes disposed upon an integrated circuit.

As mentioned hereinabove, because phase-locked-loop circuits typically comprise portions of the circuitry of both the transmitter portions and the receiver portions of a radio transceiver, two or more phase-locked-loop circuits comprise portions of conventional radio transceivers. However, when the transmitter portion and receiver portion of a radio transceiver are not concurrently operated, but, rather, are operative during nonconcurrent time periods, such as described with respect to block 118 of the schematic representation of FIG. 1, a phase-locked-loop circuit may be shared between the receiver portion and the transmitter portion of a radio transceiver.

That is to say, during time periods in which the transmitter portion of the radio transceiver is to generate and transmit a modulated signal, the phase-locked-loop may form a portion of the transmitter portion. Conversely, when the receiver portion of the radio transceiver is to be operative to receive a modulated signal transmitted to the radio transceiver, the phase-locked-loop may form a portion of the receiver portion. Thereby, the number of phase-locked-loops required to permit two-way communication of a radio transceiver may be reduced.

Figure 3:
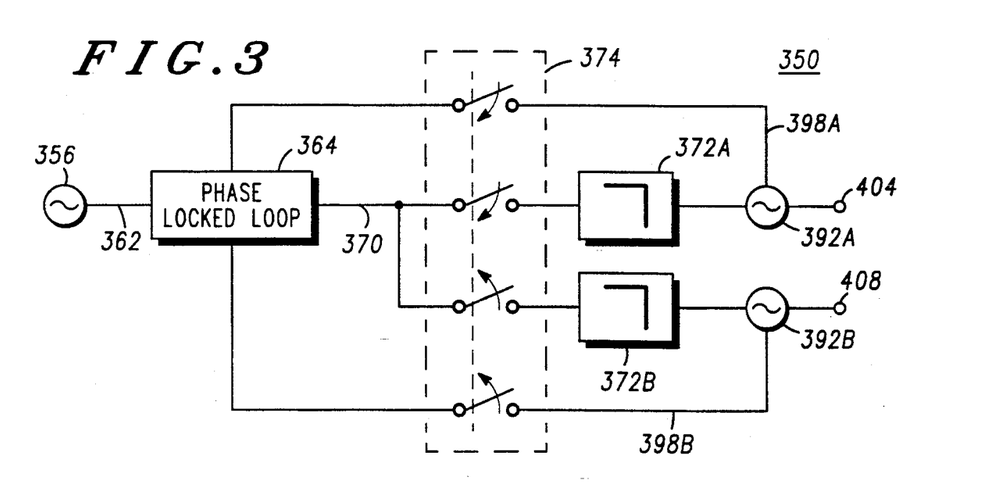
FIG. 3 is a functional block diagram of a phase-locked-loop circuit of a preferred embodiment of the present invention.

FIG. 3 is a functional block diagram of a circuit, referred to generally by reference numeral 350, of a preferred embodiment of the present invention. Circuit 350, similar with that of circuit 150 of FIG. 2, is operative to lock the frequency of oscillation of an oscillating signal generated by an oscillator with the reference oscillation frequency of an oscillating signal generated by a reference oscillator.

A reference oscillator, here reference oscillator 356, generates an oscillating signal on line 362 which is applied to phase-locked-loop circuit 364. Circuit 364 is preferably similar in construction with that of the phase-locked-loop circuit represented by block 264 of FIG. 2. Phase-locked-loop circuit 364 generates a signal on line 370 which is applied, alternately, to filter 372A and then to oscillator 392A, or, alternately, filter 372B and then to oscillator 392B. A switch, here indicated by block 374, shown in hatch, and represented as a multiple-pole, single-throw switch, alternately connects line 370 with oscillator 392A (by way of filter 372A) or oscillator 392B (by way of filter 372B).

Oscillator 392A is operative to generate an oscillating signal on line 404 which is applied to mixer circuitry of a transmitter portion of a radio transceiver. Oscillator 392B is operative to generate an oscillating signal on line 408 which is coupled to mixer circuitry of a receiver portion of a radio transceiver.

A single phase-locked-loop, here circuit 364, is operative to lock the frequency of either oscillator 392A or oscillator 392B to the oscillating frequency of the oscillating signal generated by reference oscillator 356. By appropriate positioning of switch 374, phase-locked-loop circuit 364 may be connected with oscillator 392A during times in which the transmitter portion of a radio transceiver is to be operative to generate and transmit a modulated signal. And, similarly, by appropriate positioning of switch 374, the phase-locked-loop circuit may be coupled with oscillator 392B during times in which the receiver portion of a radio transceiver is to be operative to receive a modulated signal.

While switch 374 may be comprised of any switching mechanism operative in the manner represented by the multiple-pole, single-throw switch shown in FIG. 3, the switch is preferably actually comprised of a multiplexer or PIN diodes, or, as will be noted hereinbelow, a combination of a multiplexer and PIN diodes.

Figure 4:
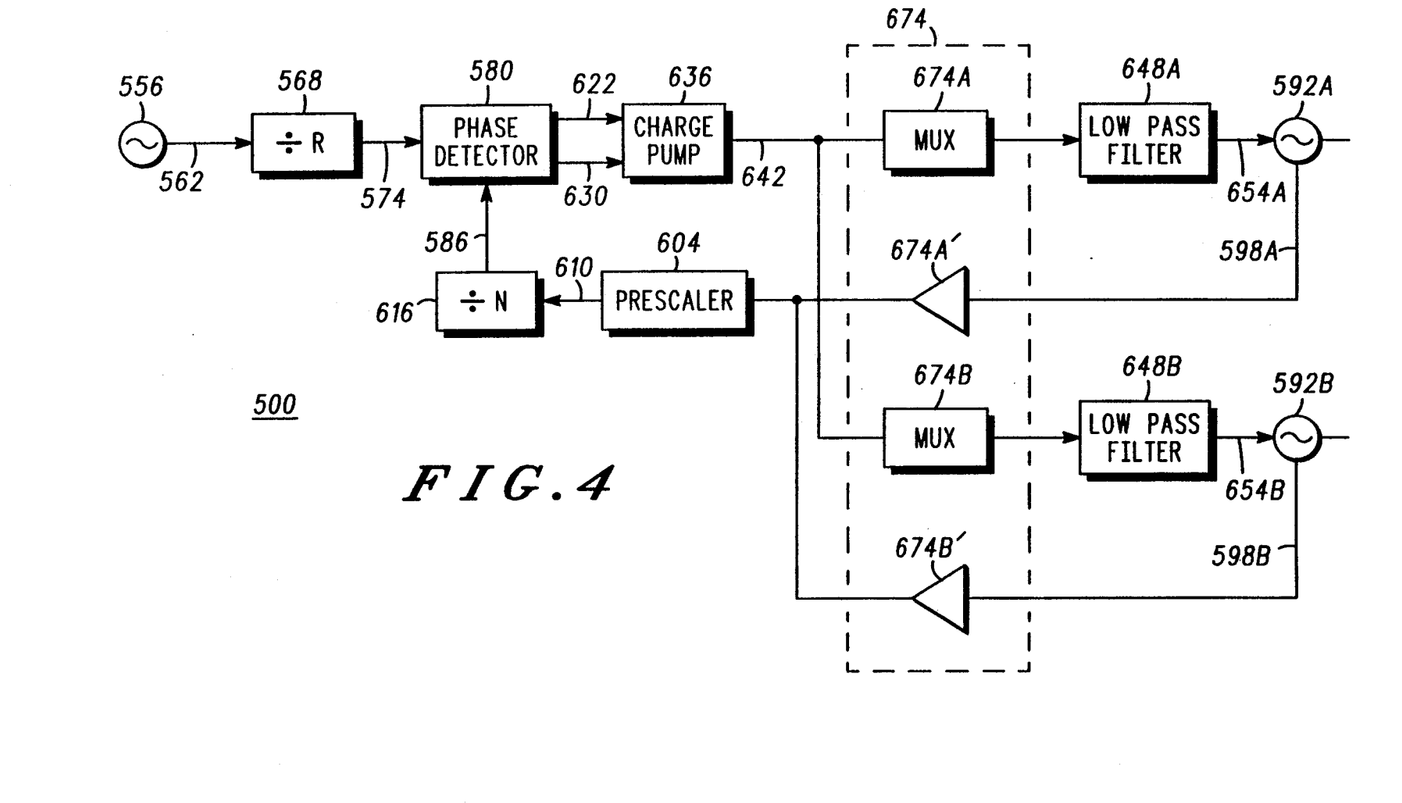
FIG. 4 is a block diagram of a first preferred implementation of the phase-locked-loop circuit of the present invention.

Turning now to the block diagram of FIG. 4, there is shown in greater detail a circuit, referred to generally by reference numeral 550, of a first, preferred implementation of the phase-locked-loop circuit of the present invention. Again, a reference oscillator, here oscillator 556 generates an oscillating signal of a reference oscillation frequency on line 562 which is applied to divider circuit 568. Divider 568 is operative to reduce the frequency of the frequency of a signal applied thereto by a desired factor, and to generate a reduced-frequency signal on line 574.

Line 574 is coupled to a first input of phase detector 580. Line 586 supplies to phase detector 580 a signal representative of an oscillating signal generated by either oscillator 592A or 592B. Oscillator 592A generates an oscillating signal on line 598A, and oscillator 592B generates an oscillating signal on line 598B. Either line 598A or line 598B is coupled to prescaler 604 which generates a scaled signal on line 610 which is coupled to divider circuit 616. Divider 616 is operative in a manner similar with that of divider 568 to reduce the frequency of a signal applied thereto by a desired factor (such factor is indicated in the Figure as factor N).

Phase detector 580 is operative to detect phase differences between the signals applied thereto on lines 574 and 586, and to generate output signals, here on lines 622 and 630, indicative of phase differences between the two signals applied thereto. Charge pump 636 generates a signal on line 642 which is applied either to filter 648A or filter 648B. Filter 648A generates a signal on line 654A which is applied to oscillator 592A to alter the oscillating frequency thereof. Similarly, filter 648B generates a signal on line 654B which is applied to oscillator 592B to alter the oscillating frequency thereof.

A switch, here indicated by block 674, shown in hatch, and represented by multiplexers 674A and 674B and PIN diodes 674A' and 674B', alternately connects charge pump 636 with filter 648A or charge pump 636 with filter 648B. While FIG. 4 illustrates two blocks 674A and 674B, it is noted that a single multiplexer may comprise both multiplexers 674A and 674B shown in FIG. 4. Here, multiplexer 674A and diode 674A' open and close in unison, as do multiplexer 674B and diode 674B'. When multiplexer 674A and diode 674A' are in a closed position, multiplexer 674B and diode 674B' are in an open position, and vice versa. Also, and as shown, switch 674 alternately connects line 598A with prescaler 604, or line 598B with prescaler 604.

During times in which the transmitter portion of a radio transceiver is to transmit a modulated signal, multiplexer 674A and diode 674A' are closed to permit locking of the frequency of the oscillating signal generated by oscillator 592A with the frequency of the oscillating signal generated by reference oscillator 556. Conversely, when the receiver portion of a radio transceiver is to be operative to receive a modulated signal transmitted thereto, multiplexer 674B and diode 674B' are positioned in the closed position to frequency lock the oscillating signal generated by oscillator 592B with the oscillating signal generated by reference oscillator 556.

Figure 5:
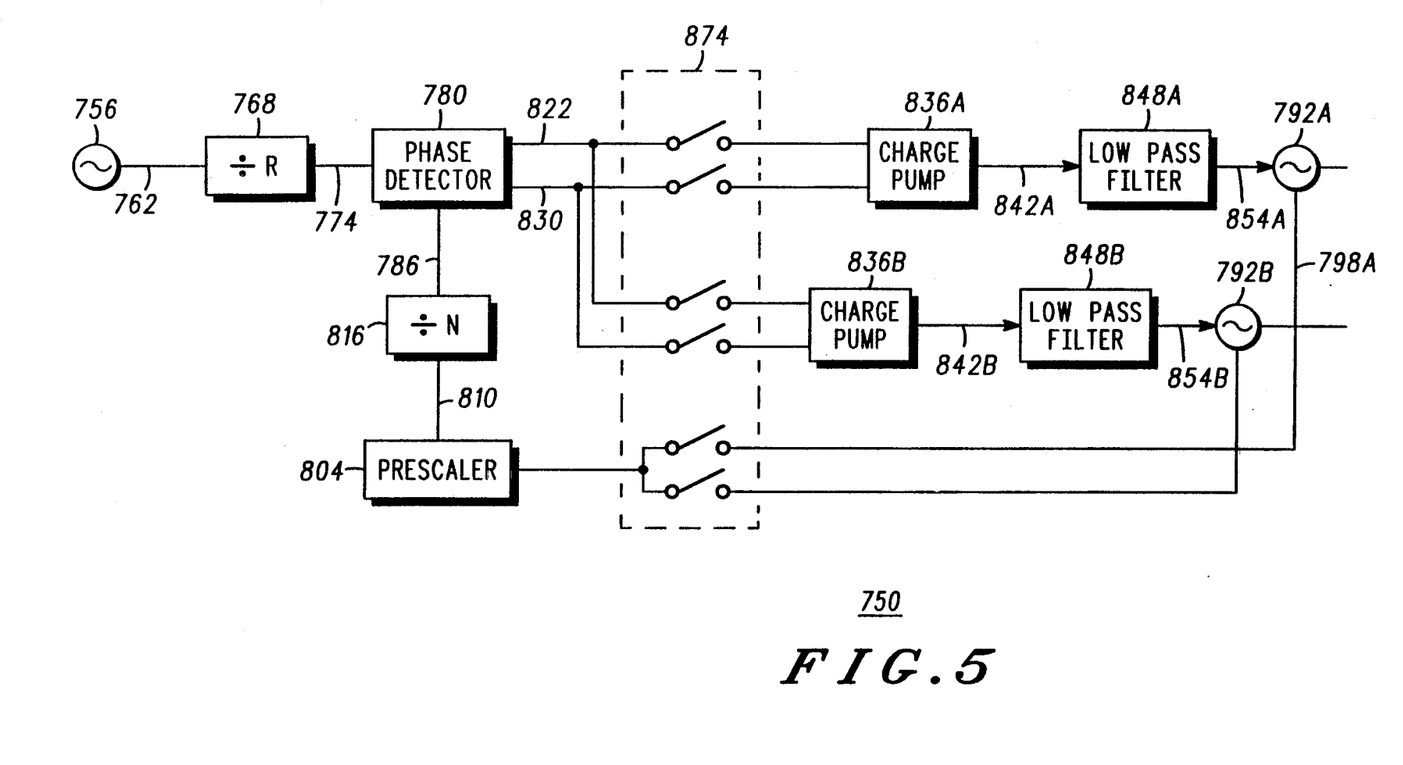
FIG. 5 is a block diagram of a second preferred implementation of the phase-locked-loop circuit of the present invention.

FIG. 5 is a block diagram of a circuit, here referred to generally by reference numeral 750, of a second preferred implementation of the preferred embodiment of the present invention. Again, a reference oscillator, here oscillator 756, generates a reference oscillation signal having a reference oscillation frequency on line 762. Line 762 is coupled to divider circuit 768 which is operative to reduce the frequency of the oscillating signal applied thereto by a desired factor (again, such factor is indicated in FIG. 5 as factor R), and to generate an oscillating signal on line 774 of a reduced frequency. Line 774 is coupled to an input of phase detector 780. Line 786 is applied to a second input of phase detector 780. The signal applied to detector 780 on line 786 is representative of the oscillating signal generated by either oscillator 792A or oscillator 792B.

Oscillator 792A generates an oscillating signal on line 798A; similarly oscillator 792B generates an oscillating signal on line 798B. Either line 798A or line 798B is coupled to prescaler 804 which generates a scaled signal on line 810 which is applied to divider circuit 816. Divider circuit 816 is operative in a manner similar with that of divider 768 to reduce the frequency of a signal applied thereto by a desired factor (again, such factor is indicated in FIG. 5 as factor N).

Phase detector 780 is operative to compare the phases of the signals applied thereto on lines 774 and 786, and to generate signals, here on lines 822 and 830 of values representative of the phase differences therebetween. Lines 822 and 830 are connected, alternately, to charge pump 836A or to charge pump 836B.

Charge pump 836A generates a signal on line 842A which is applied to a storage device, here filter 848A. Filter 848A generates a filtered signal on line 854A which is applied to oscillator 792A to alter the oscillating frequency thereof. Similarly, charge pump 836B generates a signal on line 842B which is applied to a storage element, here filter 848B. Filter 848B generates a filtered signal on line 854B which is applied to oscillator 792B to alter the oscillating frequency thereof.

A switch, here indicated by block 874, shown in hatch, and represented by a multiple-pole, single-throw switch, is operative alternately to lock the frequency of oscillator 792A with that of the oscillating frequency of the oscillating signal generated by reference oscillator 756, or to lock the frequency of the oscillating signal generated by oscillator 792B with the oscillating signal generated by reference oscillator 756. It is noted that, while for purposes of illustration, switch 874 is represented by the multiple-pole, single-throw switch, the switch is again preferably comprised of a multiplexer and PIN diode combination. More particularly, the switch portions interconnecting oscillators 792A and 792B are preferably comprised of PIN diodes, and the switch portions interconnecting phase detector 780 and charge pump 836A and 836B are preferably comprised of a multiplexer. The switch-poles of switch 874 are positioned to permit frequency locking of the oscillating signal generated by oscillator 792A during times in which the transmitter portion of a radio transceiver is to be operative to transmit a modulated signal, and to permit frequency locking of oscillator 792B when a modulated signal is to be received by the receiver portion of a radio transceiver.

Figure 6:
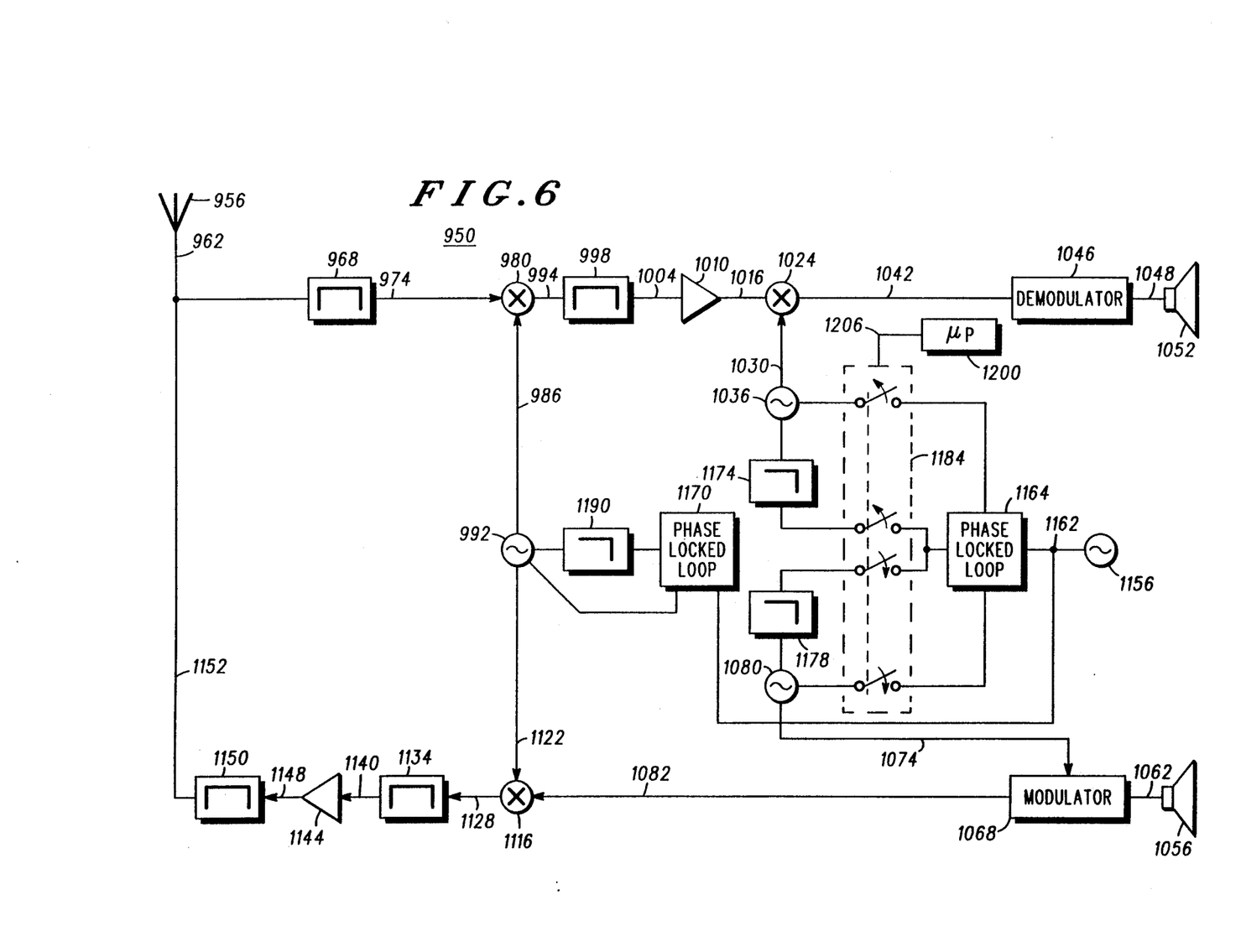
FIG. 6 is a block diagram of a radio transceiver constructed according to the teachings of a preferred embodiment of the present invention.

Turning next to the block diagram of FIG. 6, a radio transceiver, here indicated generally by reference numeral 950, operative to transmit and to receive modulated signals during nonconcurrent time periods is shown. Radio telephone 950 includes a phase-locked-loop circuit shown in the preceding Figures as a portion thereof. The receiver portion of transceiver 950 is represented by the blocks at the top-half portion of the Figure, and the transmitter portion of transceiver 950 is represented by the blocks at the bottom half portion of the Figure.

When operative to receive a modulated signal transmitted to the transceiver, antenna 956 converts a radio-frequency, electromagnetic signal received there at into an electrical signal on line 962. Line 962 is coupled to filter circuit 968 to filter the signal applied thereto, and to generate a filtered signal on line 974. Line 974 is applied to a first input of mixer circuit 980. Line 986 is coupled to a second input of mixer circuit 980. Oscillator 992 generates an oscillating signal on line 986. Mixer 980 is operative to down-convert in frequency the signal applied thereto on line 974, and, to generate a down-converted signal on line 994 indicative thereof.

Line 994 is coupled to filter 998 which generates a filtered signal on line 1004. Line 1004, in turn, is coupled to amplifier 1010 which generates an amplified signal on line 1016. The signal generated on line 1016 is applied to a first input of mixer 1024. Line 1030 is coupled to a second input of mixer circuit 1024. Oscillator 1036 generates an oscillating signal on line 1030. Mixer 1024 generates a second, down-mixed signal on line 1042. Line 1042 is coupled to demodulator circuit 1046. Demodulator 1046 generates a demodulated signal on line 1048 which is applied to a transducer, such as speaker 1052.

When radio transceiver 950 is operative to generate and to transmit a modulated signal, a transducer, such as transducer 1056, converts a signal into electrical form on line 1062. Line 1062 is coupled to modulator circuit 1068 to apply the electrical signal generated thereon to modulator circuit 1068. Line 1074 is also coupled to modulator 1068. Oscillator 1080 generates an oscillating signal on line 1074. Modulator 1068 generates a signal on line 1082 which is applied to a first input of mixer 1116.

An oscillating signal generated on line 1122 by oscillator 992 is applied to a second input of mixer 1116.

Mixer 1116 is operative to up-convert in frequency the signal applied thereto on line 1110, and to generate an up-converted signal on line 1128. Line 1128 is coupled to filter 1134 which generates a filtered signal on 1140. Line 1140 is coupled to an input of amplifier 1144 which generates an amplified signal on line 1148. Such amplified signal is applied to filter 1150. Filter 1150 generates a filtered signal on line 1152 which is coupled to antenna 956 whereat the signal is transmitted therefrom.

Reference oscillator 1156 generates a reference oscillation signal on line 1162 which is applied to phase-locked-loop 1164 and also to phase-locked-loop 1170. Phase-locked-loop circuits 1164 and 1170 are preferably similar in construction with that of circuit 264 of FIG. 2. Circuit 1164 is alternately coupled to filter 1174 and then to oscillator 1036 or to filter 1178 and then to oscillator 1080 by way of a switch, here indicated by block 1184, shown in hatch. Depending upon the position of the switch, either oscillator 1036 or oscillator 1080 is coupled with phase-locked-loop circuit 1164, and, in turn, reference oscillator 1156 to lock the oscillating signal generated by the one, or the other, of the oscillators 1036 or 1080 with a reference oscillation frequency of an oscillation signal generated by reference oscillator 1156.

Phase-locked-loop 1170 is coupled to oscillator 992 by way of filter 1190 to lock the oscillating signal generated by oscillator 992 with that of reference oscillator 1156.

Radio transceiver 950 preferably further comprises processor 1200 which generates a control signal on line 1206 to control positioning of switch 1184. Processor 1200 is operative to generate the control signal on line 1206 to connect phase-locked-loop circuit 1164 with oscillator 1036 when radio transceiver 950 is to be operative to receive a modulated signal transmitted thereto, and to generate a control signal to connect phase-locked-loop circuit 1164 with oscillator 1080 during times in which radio transceiver 950 is to be operative to generate and to transmit a modulated signal therefrom.

Figure 7:
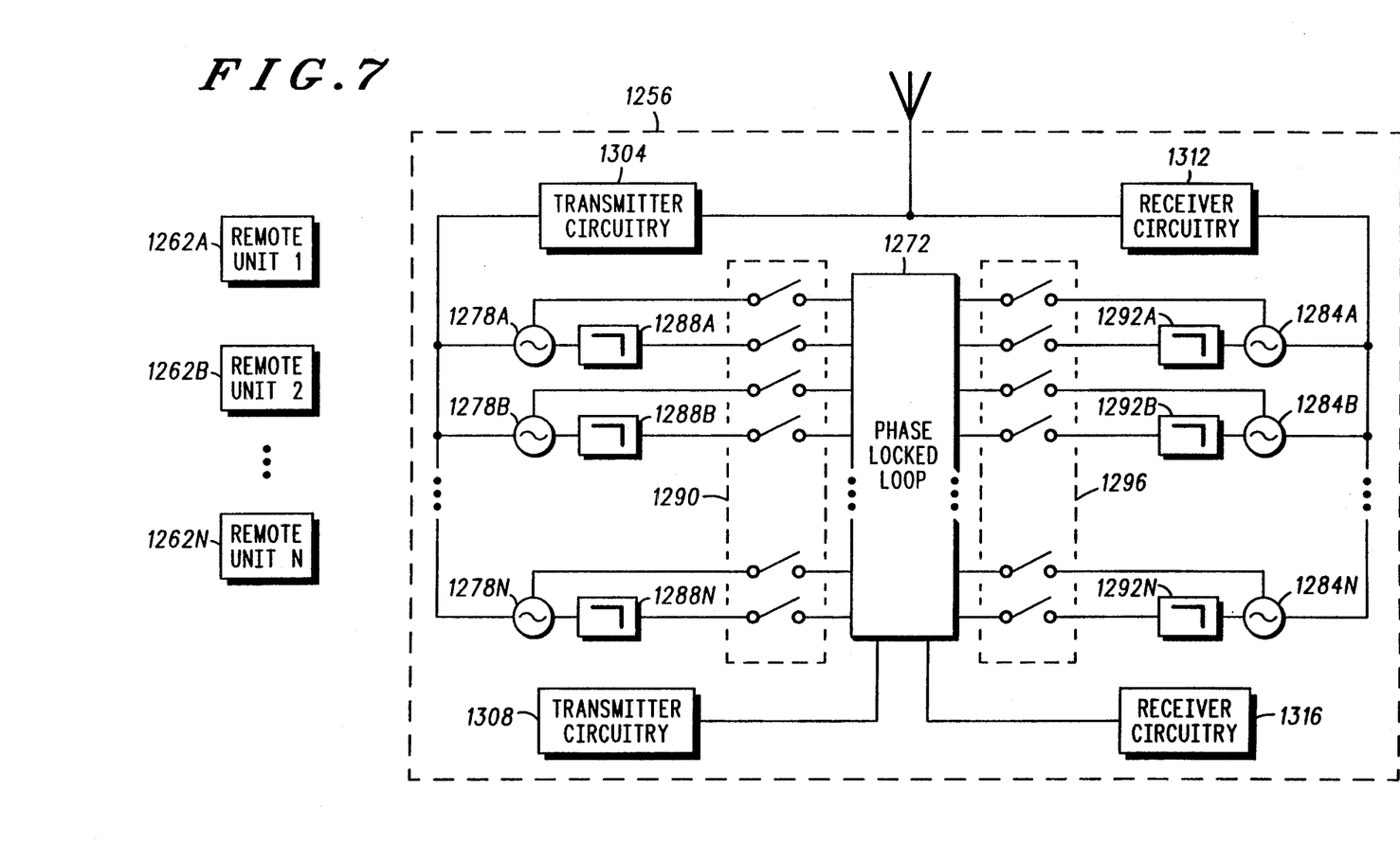
FIG. 7 is a block diagram of communication apparatus incorporating the teachings of the present invention, and operative to transmit and to receive modulated signals to communicate thereby with a plurality of remotely-positioned units.

Turning finally now to the block diagram of FIG. 7, a radio communication system including communication apparatus 1256 and a plurality of remote units 1262A-1262N is shown. Each of the remote units 1262A-1262N preferably includes circuitry such as that shown previously in FIG. 6.

Apparatus 1256, however, comprises a phase-locked-loop circuit, here referred to by reference numeral 1272 and a plurality of oscillators, here referred to by reference numerals 1278A-1278N and 1284A-1284N. Phase-locked-loop 1272 is selectively coupled to any desired one of the oscillators 1278A-N or 1284A-N by way of storage elements (here, again, low pass filters) 1288A-N or 1292A-N, respectively, by appropriate positioning of a switches 1290 and/or 1296. Oscillators 1278A-N are appropriately coupled to transmitter circuitry, here indicated by blocks 1304 and 1308, and oscillators 1284A-1284N are appropriately coupled to receiver circuitry, here indicated by blocks 1312 and 1316. In this manner, a single phase-locked-loop circuit may be coupled to any of a plurality of oscillators.

While the present invention has been described in connection with the preferred embodiment shown in the various figures, it is to be understood that other similar embodiments may be used and modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. In a radio transceiver having a transmitter portion having a local oscillator which generates a local oscillation signal and a receiver portion also having a local oscillator which generates a local oscillation signal, a combination, alternately with the local oscillator of the receiver portion and the local oscillator of the transmitter portion, of oscillator frequency control circuitry, said oscillator frequency control circuitry comprising:

a reference oscillator for generating a reference oscillation signal of a reference oscillation frequency;

a phase detector coupled to receive signals representative of the reference oscillation signal generated by said reference oscillator and, alternately, of the local oscillation signal generated alternately by the local oscillator of the receiver portion or the local oscillation signal generated by the transmitter portion, and operative to generate a phase difference signal responsive to detected phase differences between the reference oscillation signal and the local oscillation signal generated by the local oscillator of the receiver portion or between the reference oscillation signal and the local oscillation signal generated by the local oscillator of the transmitter portion;

a means for altering comprised of a first portion coupled to the local oscillator of the receiver portion and a second portion coupled to the local oscillator of the transmitter portion, said means for altering operable alternatively: 1) to alter characteristics of the local oscillation signal generated by the local oscillator of the receiver portion or 2) to alter characteristics of the local oscillation signal generated by the local oscillator of the transmitter portion;

a switch positionable in a first switch position for supplying the local oscillation signal generated by the local oscillator of the receiver portion to the phase detector and also the phase difference signal generated by the phase detector to the first portion of the means for altering or, alternately, positionable in a second switch position for supplying the local oscillation signal generated by the local oscillator of the transmitter portion to the phase detector and also the phase difference signal generated by the phase detector to the second portion of the means for altering such that the means for altering alters the characteristics of the local oscillation signal generated by the local oscillator of the receiver portion when the switch is positioned in the first switch position and such that the means for altering alters the characteristics of the local oscillation signal generated by the local oscillator of the transmitter portion when the switch is positioned in the second switch position.

2. The combination of claim 1 further comprising control means for generating a control signal for controlling positioning of the switch to permit supply of the local oscillation signal generated by the local oscillator of the receiver portion to the phase detector and also the phase difference signal generated by the phase detector to the first portion of the means for altering or, alternately, to permit supply of the local oscillation signal generated by the local oscillator of the transmitter portion to the phase detector and also the phase difference signal generated by the phase detector to the second portion of the means for altering.

3. The combination of claim 2 wherein the switch comprises a multiplexer coupled to receive the control signal generated by said control means.

4. The combination of claim 2 wherein said control means generates the control signal to position the switch in the first switch position to permit the supply of the local oscillation signal generated by the local oscillator of the receiver portion to the phase detector and also the phase difference signal generated by the phase detector to the first portion of the means for altering during time periods in which the receiver portion of the radio transceiver is to be operative to receive a signal.

5. The combination of claim 2 wherein said control means generates the control signal to position the switch in the second switch position to permit the supply of the local oscillation signal generated by the local oscillator of the transmitter portion to the phase detector and also the phase difference signal generated by the phase detector to the second portion of the means for altering during time periods in which the transmitter portion of the radio transceiver is to be operative to transmit a signal.

6. A phase-locked-loop circuit for a radio transceiver having a transmitter portion having a local oscillator which generates a local oscillation signal and a receiver portion also having a local oscillator which generates a local oscillation signal, said phase-locked-loop circuit comprising:

means forming a reference oscillator for generating a reference oscillation signal of a reference oscillation frequency;

means for comparing coupled to receive signals representative of the reference oscillation signal generated by the reference oscillator and, alternately either signals representative of the local oscillator of the transmitter portion or signals representative of the local oscillator of the receiver portion, said means for comparing operable to generate a comparison signal indicative alternately of: 1.) characteristics of the signals representative of the reference oscillation signal generated by the reference oscillator with characteristics of the signals representative of the local oscillation signal generated by the local oscillator of the transmitter portion when the signals representative of the reference oscillation signal are compared with the signals representative of the local oscillation signal generated by the local oscillator of the transmitter portion; or 2.) characteristics of the signals representative of the reference oscillation signal generated by the reference oscillator with characteristics of the signals representative of the local oscillation signal generated by the local oscillator of the receiver portion when the signals representative of the reference oscillation signal are compared with the signals representative of the local oscillation signal generated by the local oscillator of the receiver portion;

means forming a switch for connecting said means for comparing and a means for altering with the local oscillator of the transmitter portion, or, alternately, with the local oscillator of the receiver portion; and said means for altering coupled to receive the comparison signal generated by the means for comparing and operable alternately: 1.) to alter characteristics of the local oscillation signal generated by the local oscillator of the transmitter portion when the signals representative of the reference oscillation signal are compared with the signals representative of the local oscillation signal generated by the local oscillator of the transmitter portion; or 2.) to alter the characteristic of the local oscillation signal generated by the local oscillator of the receiver portion when the signals representative of the reference oscillation signal are compared with the signals representative of the local oscillation signal generated by the local oscillator of the receiver portion.

7. The phase-locked-loop circuit of claim 6 further comprising control means for generating a control signal for controlling positioning of the means forming the switch to connect either the local oscillator of the transmitter portion or the local oscillator of the receiver portion with the means for comparing and the means for altering.

8. The phase-locked-loop circuit of claim 7 wherein the means forming the switch comprises a multiplexer coupled to receive the control signal generated by said control means.

* * * * *